Dec. 9, 1958 H. FRENCH 2,863,999

WAVE SHAPER

Filed April 21, 1953 2 Sheets-Sheet 1

INVENTOR.
Hubert French
BY [signature]
ATTORNEY

Dec. 9, 1958 H. FRENCH 2,863,999

WAVE SHAPER

Filed April 21, 1953 2 Sheets-Sheet 2

INVENTOR.
Hubert French

BY [signature]
ATTORNEY

United States Patent Office 2,863,999

Patented Dec. 9, 1958

2,863,999

WAVE SHAPER

Hubert French, Brooklyn, N. Y., assignor to Radio Corporation of America, a corporation of Delaware Application April 21, 1953, Serial No. 350,090

11 Claims. (Cl. 250—27)

This invention relates to wave shaping, and more particularly to the correction of high frequency attenuation in television.

In modern television, the composite video signal often suffers a loss of its higher frequency components. This may occur, for example, in the transmission of television signals through low pass transmission lines, such as commercial coaxial cables from a network origin or other source. To illustrate the effect of loss of high frequency components, one can take the case of a rectangular or square wave, such as the horizontal sync signal, which arrives at the transmitter from the transmission line having curved edges instead of straight vertical ones.

Similar problems are also present in television receivers where partial loss of the higher frequency components results in diminished definition or "sharpness." In the picture as seen by the observer, as the size of picture tubes grows larger it becomes desirable to produce the same apparent definition that smaller picture tubes possess. Projection types of television receiving systems, where the viewing area is particularly large, require restoration of sharpness even more to offset the fuzziness resulting from diminished apparent definition.

A related type of difficulty encountered in television is "aperture distortion" which arises because the scanning beam has a finite width. In the camera tube, whenever the scanning electron beam for example traverses a black rectangular area or element adjacent to a white rectangular area, the tube output corresponding to the sharp contrast junction of those areas will be mixed or gray since the beam overlaps equal portions of the black and white elements simultaneously. As a result instead of the output wave being a square wave with steep vertical front and back edges, the latter will have curved front and back edges and the top of the wave will also tend to be curved. This curved wave exhibits similarity to the case of attenuation of high frequencies explained previously. The effect upon a signal is thus similar to that of a low pass filter.

In both cases, it is desirable to decrease the rise time of signal waveforms to approximate more closely the original picture or signal, or at least give the impression of greater sharpness within a limited bandwidth. Various systems have heretofore been proposed to accomplish this, but the present invention has advantages of greater convenience, flexibility, and simplicity. It also can provide peaking without negligible phase shift.

The object of the present invention is to provide a means by which the phase and amplitude of boosted high frequencies may be adjusted independently of each other.

Another object is to apply high frequency components derived from one portion of an input signal source to decrease the rise and fall times of said input signals.

Still another object of the present invention is to improve the sharpness of images in television receivers by making a more rapid transition from an amplitude of an electrical signal representing black to an amplitude of a signal representing white when the corresponding image has adjacent black and white areas.

According to the present invention input signals from an external source are treated in two different paths. The first or main signal path is primarily used to pass a portion of the input signal. The second or peaking path inverts the phase of another portion of the input signals and the resulting set of signals, which are 180° out of phase with each other, are applied to a differentiating network having elements common to both the main signal path and to the peaking path. The differentiated set of spikes corresponding to the positive signal are mixed with the differentiated set of spikes corresponding to the negative signal in time delayed relation. Both sets of spikes are then added to the main signal in the first path so as to compensate for the loss of high frequencies in the input signals.

The invention as described in the following text is more easily understood when accompanied by the drawings in which.

Figures 1, 2, 3:
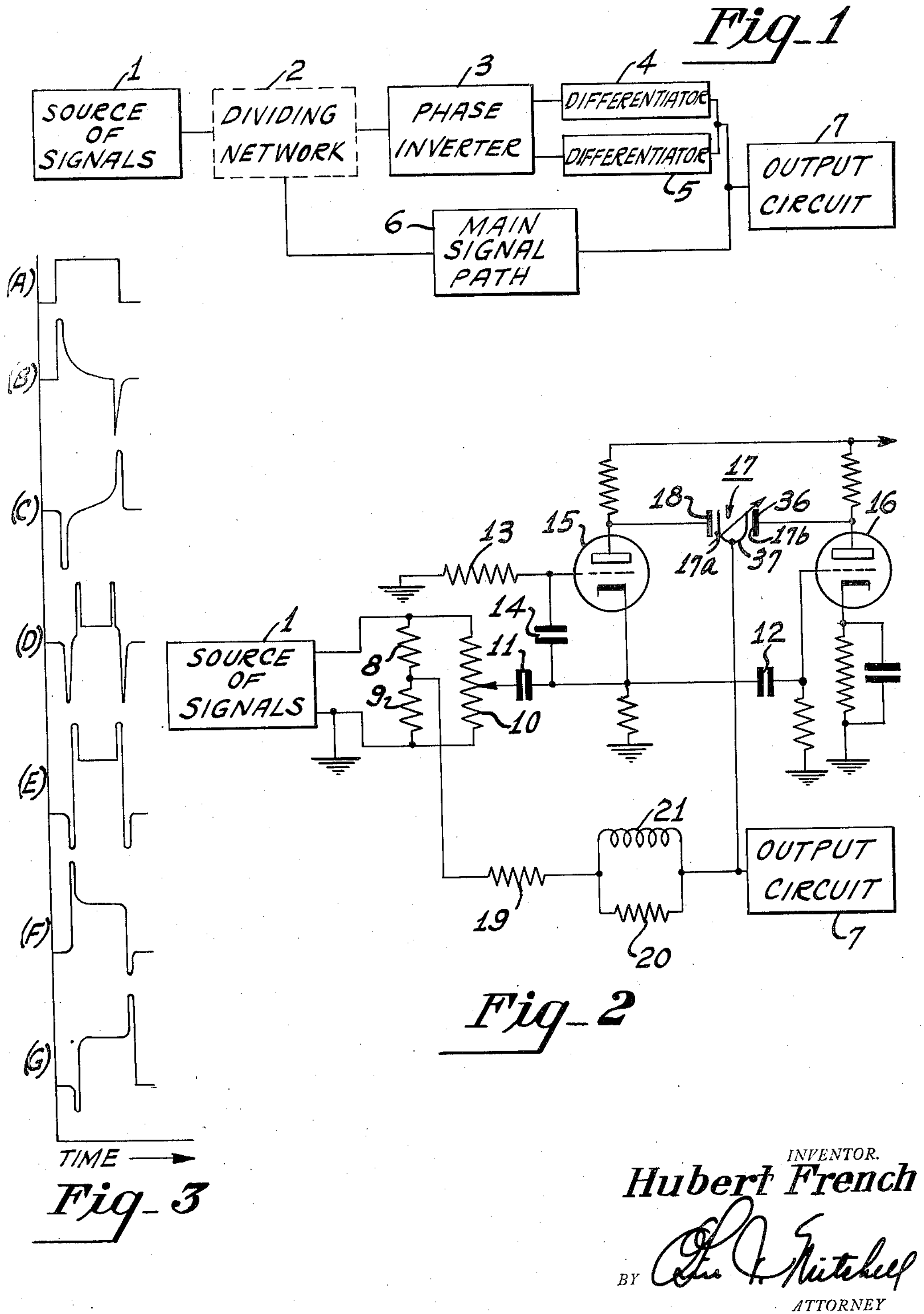
Figure 1 is a block diagram of one form of the invention.
Figure 2 is a simplified circuit and block diagram of one form of my invention.
Figure 3 depicts the waveforms of the signals that can be produced by my invention.

Referring to Figure 1, a source of composite video signals 1 which may be, for example, the termination of a coaxial cable used to transmit network television programs to the local transmitter is coupled to a dividing network 2.

One portion of the output of the dividing network is fed to a phase splitter or phase inverter 3 which produces a push-pull output. One part of the latter output is fed to differentiator 4 which may be of the conventional resistance and capacitance type, and the other is passed to another similar differentiator 5. The differentiator 4 produces a wave having a positive leading edge spike and a negative trailing edge spike, whereas differentiator 5 produces a negative leading edge spike and a positive trailing edge spike. Were these two waves simply added together there would be mutual cancellation of the spikes. It is therefore necessary to introduce relatively small delay, so that when the outputs of the differentiators 4 and 5 are recombined they will be very slightly displaced in time. The main signal from source 1 which was tapped off in dividing network 2 is then recombined with the output of the differentiators 4 and 5, and the resultant wave is applied to an output circuit 7 which may be, for example, stages of amplification in the local transmitter.

Coming now to Figure 2, a source of signals 1 supplies a signal which, for example, could be a square wave as shown in curve A of Figure 3 across series resistors 8 and 9 which provide two levels of input to the following circuitry. At the junction of resistor 8 and resistor 9, a portion of the input signals is tapped off and applied to the circuit consisting of resistor 19, inductance 21, and resistor 20. Another portion of the input wave is impressed by way of variable resistance 10 and coupling condenser 11 to the cathode of tube 15 and also via coupling condenser 12 to the grid of tube 16. Thus, the input square wave, appearing on the cathode of tube 15, will have its polarity unchanged in the plate circuit of tube 15. On the other hand, the square wave applied to the grid of tube 16 will be of opposite polarity on the plate of tube 16. Variable double condenser 17 which consists of capacitive elements 17*a* and 17*b* is comprised of stators 18 and 36 and rotor 37 so arranged that as one part of rotor 37 meshes with stator 18 the other part unmeshes from stator 36 and vice versa. Both parts of the rotor may be mounted on one shaft so that as the capacity of capacitive element 17*a* increases, the capacity of capacitive element 17*b* decreases, and vice versa.

The double condenser 17 acts as coupling condensers and also as part of the differentiating network which consists of the double condenser 17, the resistors 19 and 20, and inductance 21. The resulting differentiated spikes containing the higher frequency components excite the inductance 21 which resonates at these frequencies without ringing because of the damping effect of resistor 20.

When the variable resistor 10 is positioned so that no peaking of the input from source 1 occurs, the inductance 21 attenuates the higher frequencies, in the same frequency range where peaking occurs when added. When the differentiated spikes are added to the incoming signal this attenuation effect is obscured and the inductance 21 resonates to increase the peaking. An enlarged view of the spikes produced from the positive signal are shown at curve B, Figure 3; those from the negative signal are shown at curve C, Figure 3.

To prevent the mutual cancellation of the differentiated pulses thus produced, a delay network consisting of resistor 13 and condenser 14 is introduced at the grid of tube 15, thus causing the phase of the output wave of tube 15 shown at curve B, Figure 3 to lag with respect to the output of tube 16 shown at curve C, Figure 3. The differentiated pulses, having been mixed at the common terminal of variable condensers 17 and 18 to form the spike waveform illustrated in curve D, Figure 3, are then recombined with the portion of the main signal and applied to output circuit 7.

Since the rotor of double condenser 17 is mounted on a common shaft with stators 180° apart, an increase in the capacity of capacitive element 17*a* and a simultaneous decrease in the capacity of capacitive element 17*b* results in a greater amplitude of positive differentiated pulse on the leading edge of the signal, and a reduction of the negative spike on the trailing edge as shown in curve F, Figure 3. The opposite case is produced when the capacity of condenser 18 is decreased and that of condenser 36 is increased resulting in an output waveform as shown at curve G, Figure 3. It is also possible to produce a waveform having its positive spikes equal in amplitude and its negative spikes also equal in amplitude. This symmetrical wave shape is shown at curve E, Figure 3, and constitutes one of the chief advantages of this circuit inasmuch as it may be produced merely by a single rotation of the common rotor shaft of double condenser 17. Whenever this symmetrical wave is produced there is a decrease in the rise time on both edges but no appreciable phase shift is introduced. This is a very useful characteristic when the incoming signal is also symmetrical, but has its leading and trailing edges both curved. The symmetrical spikes added to the incoming signal have half their amplitudes positive and half negative. Thus very large "overshoots," that is excursions of positive spikes far beyond the normal top of the incoming wave, which are normal to this amount of peaking, are avoided.

The amplitude of the spikes is adjusted by varying resistor 10. Should a signal arrive from source 1 which does not require compensation on peaking, it is thus possible to reduce the added spike amplitude to negligible proportions. It is thus seen that the spike amplitude is adjustable without altering the spectrum wherein the higher frequencies are boosted so that there is a negligible phase shift attendant upon a change in the input level.

Since the input to tube 15 does not constitute a very high impedance, the variation of resistor 10 would tend to create a variable load across the source which in most instances would be undesirable. For example, if the input happened to be from a transmission line, a mistermination might give rise to reflection of the signal.

Figure 4:
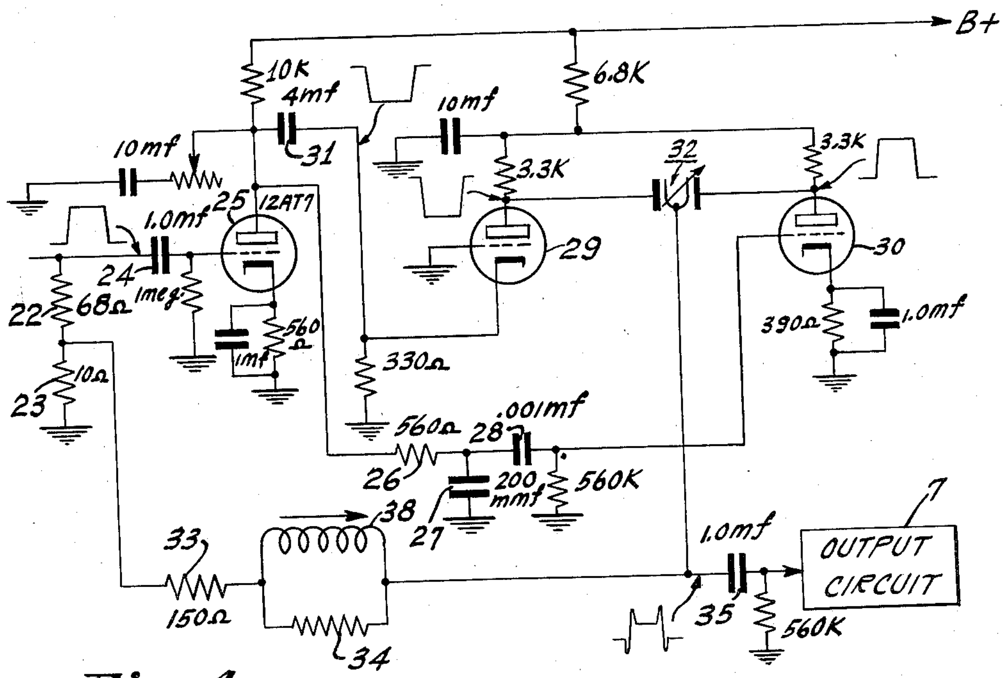
Figure 4 is a more detailed circuit corresponding to another embodiment of my invention.

This may be remedied by the insertion of an amplifier stage 25 as an additional isolation stage as shown in Figure 4. This prevents variations in the level of the input signal applied to the peaking path from affecting the impedance terminating the source 1 which may be a transmission line as indicated above.

Referring to Figure 4, an alternative form of the invention embodying the use of such an isolation stage is depicted therein. There is one other minor difference between Figure 4 and Figure 3 in that the delay is placed in the grid of the second tube, i. e. tube 30. A source 1 of signals across which is a dividing network consisting of resistors 22 and 23 provides a positive square wave via a condenser 24 to the control grid of isolating stage 25 which may be half of a 12AT7, for example. A negative pulse appears at the plate of tube 25 and is delayed by the combination of resistor 26 and condenser 27 before being applied via coupling condenser 28 to the grid of tube 30. The negative square pulse in the output of tube 25 is also applied by way of condenser 31 to the cathode of tube 29 which may be a half of a 12AT7, for example. Since the input is at the cathode of tube 29, there is no reversal in polarity in its plate circuit, and the negative square wave when applied to the circuit consisting of double condenser 32 (which has its rotors on a common shaft) resistors 33 and 34 and inductance 38 produces a negative and a positive spike. The output of tube 30, on the other hand, is a positive square wave and as a result of the differentiating circuit comprising double condenser 32 and resistors 33 and 34 a positive and negative spike is developed. The original signal passes thru the network consisting of the combination of resistors 33 and 34 and inductance 38 and at the common terminal of resistor 34 and condenser 35 the spikes from the peaking path are added to produce the wave there illustrated. Condenser 35 couples this resultant composite wave to the input electrode of a conventional amplifier for increasing the gain prior to application to an output circuit 7.

Figure 5:
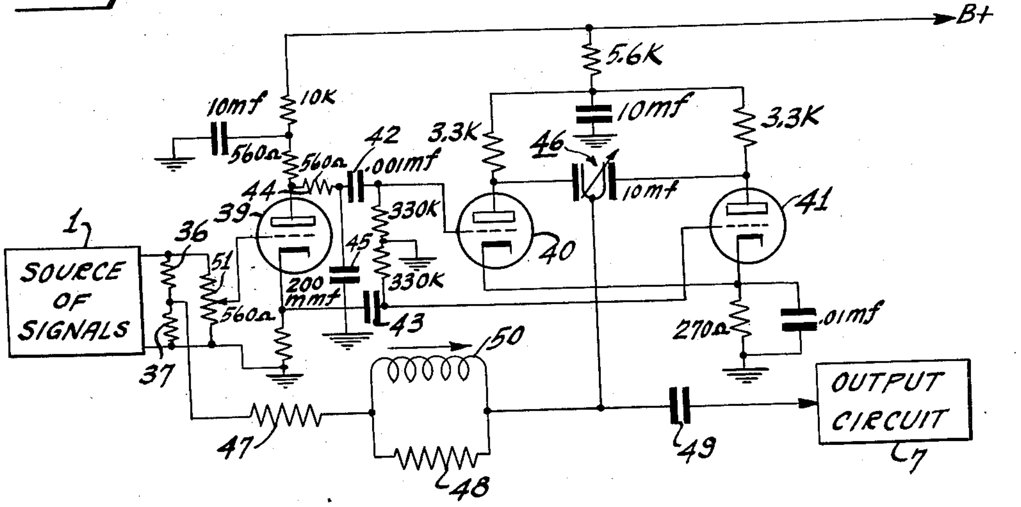
Figure 5 is an alternative form of my invention.

Still another way of using my invention is shown in Figure 5. The dividing network consisting of resistors 36 and 37 across source of signals 1 splits the input into two paths. The tap on variable resistor 51 feeds the desired amount of voltage to the grid of tube 39. This latter tube is used to provide the push-pull input to tubes 40 and 41 which follow. One output of tube 39 is taken from its plate via a coupling condenser 42 to the input electrode of tube 40. This input will be 180° out of phase with the input to tube 39. Another output is taken from the cathode of tube 39 and has the same polarity as the input to tube 39. It is coupled to the grid of tube 41 across coupling condenser 43. When this method of driving a push-pull input is used, there is less than unity gain from tube 39 so that it is necessary to compensate by adding more gain to the peaking path. It is to be noted that tube 39 also serves as the isolation stage preventing variations in resistance 51 from appreciably changing the impedance in this path and the impedance as seen from the source 1. Tubes 40 and 41 have outputs of opposite polarity which are also displaced slightly in time by virtue of the effect of resistor 44 and condenser 45 which constitute a delay circuit. Double condenser 46, resistor 47, inductance 50 and resistor 48 serve to differentiate the respective square wave outputs. They are mixed and the composite square wave with positive and negative spikes on the leading and trailing edges is coupled via condenser 49 to output circuit 7 which may be a conventional amplification stage that is used together with other stages to make up for the loss in gain as a result of the attenuation characteristic of this circuit.

In all of the embodiments illustrated, the dividing network was used to provide a much higher input to the phase splitter path than to the main signal path. The two tubes which utilize the push-pull input and which feed into the common double condenser in each case should have high transconductance and gain so as to obtain a high plate signal voltage. However, if the two latter tubes were pentodes such as 6AH6 or 6CB6 it would not be necessary to tap off for the main signal path at such a low voltage level since the pentodes would provide plate signal voltages sufficiently high with respect to the level of voltage appearing in the main signal path.

It is also apparent that with minor modifications the circuits explained above could be employed in television receivers. They could be placed after the detector stage, as for example by inserting a cathode follower stage between the detector and a following amplifier. The two inputs could be taken off two cathode resistors of the cathode follower and treated as explained above. However, in order to minimize high frequency overloading of the amplifying stages, it would be even more desirable to place this circuit toward the very end of the receiver, that is, after the final amplifier stages and just before the input to the picture tube.

Having thus described the invention, what is claimed is:

1. Wave shaping apparatus comprising in combination a signal source, means coupled to said source for inverting a portion of said signal, means coupled to said source for differentiating a portion of said signal, means coupled to said inverting means for differentiating said inverted portion of said signal, means in cascade with one of said differentiating means for changing the relative time phase of said differentiated signal portions, and means coupled to both said differentiating means and to said source for adding the resulting differently time phased differentiated signal portions to said signal.

2. Wave shaping apparatus comprising in combination a signal channel, a phase inverter having an input circuit and a pair of output circuits, said input circuit being coupled to said signal channel, the signals in said output circuits having opposite polarities, a pair of signal differentiators, a delay circuit, said delay circuit and one of said signal differentiators connected serially between one of said inverter output circuits and said signal channel, and the other of said differentiators connected between the other said inverter output circuit and said signal channel.

3. Wave shaping apparatus comprising in combination, a source of input signals, a phase inverter for deriving first signals and second signals having opposite polarities from said input signals, means coupled to said phase inverter for delaying one of said first signals and said second signals a relatively short time with respect to the other, first means coupled to said phase inverter means for differentiating said first signals, second means coupled to said phase inverter means for differentiating said second signals, means coupling said first and second differentiating means for combining said first differentiated signals and said second differentiated signals, and means for adding said combined differentiated signals to said input signals.

4. Wave shaping apparatus comprising in combination a source of input signals, a phase inverter means coupled to said source for obtaining first signals and second signals having opposite polarities, means coupled to said phase inverter means for delaying said first signals a relatively short time with respect to said second signals, means for applying said first signals to a first differentiating means, means for applying said delayed second signals a second differentiating means, means for combining said first differentiated signals and said second differentiated signals and means for adding said combined differentiated signals to said input signals.

5. Wave shaping apparatus adapted to modify the shape of signals from a source comprising in combination, phase inverter means coupled to said source for obtaining first and second signals having opposite polarities, means coupled to said phase inverter means for delaying said first signals a relatively short time with respect to said second signals, capacitive means coupled to said phase inverter means, means coupled to said input source for passing said input signals, said capacitive means in conjunction with said signal passing means being adapted to peak high frequency components of said first and second signals, said capacitive means and said signal passing means being adapted to combine said peaked high frequency components of said first and second signals with said input signals passed through said signal passing means, wherein said signal passing means includes a resistance coupled to said signal source, and an inductance connected in parallel with at least a part of said resistance.

6. Apparatus for shaping the waveform of television signals comprising a source of said television signals, a network coupled to said source for dividing said television signals, a first electron discharge device having an input circuit and an output circuit, a second electron discharge device having an input circuit and an output circuit, only one of said electron discharge devices providing in its output circuit a phase inverted replica of signals applied to its input circuit, the other of said electron discharge devices providing in its output circuit a cophasal replica of signals applied to its input circuit, first means coupled to said dividing network for applying said television signals to the input circuit of said first discharge device, second means coupled to said dividing network for applying said television signals to the input circuit of said second discharge device, said first applying means being adapted to delay said television signals for a relatively short time, condenser means coupling said output circuits of said first and second discharge device, a first resistance coupled to said dividing network, a second resistance shunted by an inductance and connected in series with said first resistance, means for coupling said condenser means to said dividing network through said first resistance in series with said second resistance, said first and second resistance, said inductance and said condenser means being adapted to peak the high frequency components of said signals appearing in said output circuits, said coupling means also being adapted to combine said peaked high frequency components with said television signals passed through said second resistance and said inductance.

7. Apparatus for improving the waveform of television signals comprising in combination, a source of said television signals, a dividing network coupled to said source for deriving said signals at varying amplitudes, a first electron discharge device having a grid and a plate, a second electron discharge device having a grid, a cathode and a plate, means coupled to said dividing network for applying said television signals to said cathode of said first discharge device and to said grid of said second discharge device, respective means for returning the grid of said first electron discharge device and the cathode of said second electron discharge to a point of reference potential, delay means coupled to said first discharge device for delaying said television signals in said first discharge device, double condenser means coupling said plates of said first and second discharge devices, said double condenser means having first and second capacitive elements, said double condenser means being adapted so that as said first capacitive element is made to increase in capacity said second capacitive element decreases in capacity, a first resistance, a second resistance in parallel with an inductance, a connection between said dividing network and a terminal of said double condenser common to both of said first and second capacitive elements, said connection comprising said first resistance in series with said second resistance, said first and second resistances, said inductance and said double condenser being adapted to differentiate the signals appearing at the plates of said discharge devices.

8. In television apparatus adapted to be coupled to a source of signals, a voltage dividing network coupled to said source, a first electron discharge device having an anode and a control grid, said control grid being coupled to said voltage dividing network, a second electron discharge device having a cathode and an anode, said cathode being coupled to said anode of said first discharge device, a third electron discharge device having a control grid and an anode, delay means coupled to said anode of said first discharge device and to said control grid of said third discharge device, condenser means coupling said anode of said second discharge device and said anode of said third discharge device, means coupled to said condenser means and to said voltage dividing network for peaking the high frequency components of signals appearing on the anodes of said second and third discharge devices, said peaking means being also adapted to combine said peaker high frequency components with said signals passed through said peaking means from said voltage dividing network.

9. Wave shaping apparatus adapted to be coupled to a source of television signals comprising in combination a first electron discharge device coupled to said source, said first discharge device having an output circuit, a second electron discharge device having a cathode and an anode, means for coupling said first output circuit of said first discharge device to said cathode of said second discharge device, a third electron discharge device having an input electrode and an anode, delay means coupling said output circuit of said first discharge device to said input electrode of said third discharge device, condenser means coupling said anodes of said second and third discharge devices, said condenser means having two capacitive elements, said condenser means being adapted so that the capacity of one said element may be increased while the capacity of the other said element is decreased, a first resistance coupled to said source, a second resistance coupled to said first resistance, an inductance coupled to said first resistance, means for coupling said condenser means to said inductance and said second resistance, said condenser means, said first and second resistances and said inductance being adapted to peak the high frequency components of signals appearing at the anodes of said second and third electron discharge devices, said coupling means also being adapted to combine said peaked high frequency components with said signals passed through said second resistance and said inductance.

10. Wave shaping apparatus adapted to be coupled to a source of input signals comprising in combination, a voltage dividing network coupled to said source, a first electron discharge device coupled to said voltage dividing network having a cathode, a grid and an anode, a phase inverter circuit coupled between said anode and said cathode of said first discharge device for deriving, from said input signals, signals having opposite polarities, a second electron discharge device having a control electrode and a plate circuit, a third electron discharge device having a control electrode and a plate circuit, delay means coupled to said cathode of said first discharge device to said control electrode of said third discharge device, means coupled to said phase inverter circuit for applying signals of one polarity to said control electrode of said second discharge device, means coupled to said delay means for applying signals of the opposite polarity to said control electrode of said third discharge device, double condenser means coupling said plate circuit of said second discharge device to said plate circuit of said third discharge device, a first resistor coupled to said voltage dividing network, a second resistor coupled to said first resistor, an inductance coupled to said first resistor, and means for coupling said double condenser means to said inductance and said second resistor.

11. Wave shaping apparatus according to claim 10 wherein said input signals are television signals and wherein said phase inverter circuit comprises a condenser coupled to said anode of said first discharge device, a second condenser coupled to said cathode of said first discharge device, and a center tapped resistor coupling said first condenser to said second condenser.

References Cited in the file of this patent

UNITED STATES PATENTS

| | | |
|---|---|---|
| 1,315,539 | Carson | Sept. 9, 1919 |
| 2,226,459 | Bingley | Dec. 24, 1940 |
| 2,379,739 | Norton | July 3, 1945 |
| 2,400,908 | Birss | May 28, 1946 |
| 2,421,138 | Wheeler | May 27, 1947 |
| 2,426,225 | Krause | Aug. 26, 1947 |
| 2,537,589 | Johnson | Jan. 9, 1951 |
| 2,657,258 | Hester | Oct. 27, 1953 |

UNITED STATES PATENT OFFICE
CERTIFICATE OF CORRECTION

Patent No. 2,863,999 — December 9, 1958

Hubert French

It is hereby certified that error appears in the printed specification of the above numbered patent requiring correction and that the said Letters Patent should read as corrected below.

Column 6, line 45, after "having" insert -- a cathode, --.

Signed and sealed this 2nd day of June 1959.

(SEAL)
Attest:

KARL H. AXLINE

Attesting Officer

ROBERT C. WATSON
Commissioner of Patents